Patented June 24, 1930

1,766,062

UNITED STATES PATENT OFFICE

MELVIN DE GROOTE, OF ST. LOUIS, AND BERNHARD KEISER, OF WEBSTER GROVES, MISSOURI, ASSIGNORS TO WM. S. BARNICKEL & COMPANY, OF WEBSTER GROVES, MISSOURI, A CORPORATION OF MISSOURI

PROCESS FOR BREAKING PETROLEUM EMULSIONS

No Drawing.   Application filed January 21, 1929.  Serial No. 334,111.

This invention relates to the treatment of emulsions of mineral oil and water, such as petroleum emulsions, for the purpose of separating the oil from the water.

Petroleum emulsions are of the water-in-oil type, and comprise fine droplets of naturally-occurring waters or brines, dispersed in a more or less permanent state throughout the oil which constitutes the continuous phase of the emulsion. They are obtained from producing wells and from the bottom of oil storage tanks, and are commonly referred to as "cut oil," "roily oil," "emulsified oil," and "bottom settlings."

The object of our invention is to provide a novel and inexpensive process for separating emulsions of the character referred to into their component parts of oil and water or brine.

Briefly described, our process consists in subjecting a petroleum emulsion of the water-in-oil type to the action of a treating agent or demulsifying agent of the kind hereinafter described, thereby causing the emulsion to break down and separate into its component parts of oil and water or brine, when the emulsion is permitted to remain in a quiescent state after treatment.

The treating agent employed in our process consists of a substituted sulfonic aromatic body derived by the action of a condensing agent and sulfonating agent on an aromatic body and an aldehyde. Said agent is produced or obtained by introducing an aldehyde residue derived from an aliphatic aldehyde such as formaldehyde, paraldehyde, or a cyclic aldehyde, such as furfural, or an aromatic aldehyde, such as benzaldehyde, into an aromatic nucleus, particularly a polycyclic aromatic nucleus. The aromatic material may consist of benzene, toluene, naphthalene, anthracene, naphthacene, or other substances having similar properties. Instead of using the unaltered aromatic body, derivatives may be employed, such as halogen derivatives, nitro derivatives, hydrogenated derivatives, or hydroxy derivatives. If desired, the sulfonic group may be introduced into the aromatic body before the introduction of the aldehyde residue of the kind described; for instance, benzene or naphthalene sulfonic acid, or beta naphthol sulfonic acid may be employed. The general method of manufacturing demulsifying agents of the kind employed by our process is simply one of mixing the aromatic body and aldehyde, and cautiously subjecting the mixture to the action of a sulfonating agent and a condensing agent. When such material as sulfuric acid, oleum, chloro-sulfonic acid, or other substances having similar properties is cautiously employed, said material acts both as a sulfonating agent and a condensing agent at the same time. If an aromatic sulfonic acid is employed, together with an aldehyde, it is only necessary to employ a condensing agent. It is possible to introduce more than one aldehyde residue into an aromatic body; for instance, two or more moles of formaldehyde can be introduced into one mole of naphthalene. Furthermore, after the introduction of one or more aldehyde residues into the aromatic body, it is still possible to introduce other residues into the aromatic body, such as alcohol residues derived from aliphatic, aralkyl, aromatic, or cyclic alcohols. Likewise, it is possible to introduce a fatty residue or an organic detergent-forming group of the type subsequently described into the aromatic nucleus in addition to the aldehyde residue by a reaction akin to the formation of a Twitchell reagent for use in the art of fat splitting. Thus, it is to be understood that one or more aldehyde residues of the same kind or different kinds can be introduced into the aromatic, or that in the introduction of said aldehyde residue, there may also be introduced an alcohol residue of the kind previously mentioned, or a fatty residue.

It would be possible to mix one mole of formaldehyde with one mole of propyl or amyl alcohol, and introduce both aldehyde and alcohol residue into the aromatic nucleus. It would be possible to mix one mole of formaldehyde with one mole of a fatty material and mix same with an aromatic body plus sufficient sulfuric acid to produce solution, and thereby introduce an aldehyde residue and a fatty residue into the aromatic body. It might even be possible to introduce both an alcohol residue and a fatty residue into the aromatic body in addition to the aldehyde residue.

The fatty residue referred to in the procedure above described can be replaced by any organic detergent-forming residue. An organic detergent-forming body is a substance which combines with alkali to give soap or soap-like bodies. Organic detergent-forming bodies comprise three well known classes, namely, fats and fatty bodies; resinous material, such as rosin; and petroleum acids such as naphthenic acids and sulfonated petroleum acidic bodies.

In manufacturing or producing the treating agent contemplated by our process, we prefer to use the following procedure: One mole of formaldehyde as an aqueous solution containing 37%, by weight, is mixed with one mole of finely powdered naphthalene and agitated continuously with the very cautious addition of a suitable sulfonating agent, such as sulfuric acid. Care must be taken so that there is only a moderate rise in temperature. Said temperature rise is controlled by means of cooling coils. When sufficient acid is added to give a completely soluble mass, said reaction is continued with the cautious addition of oleum or chlorosulfonic acid, if required, to give a reaction mass, which on careful dilution with water, gives an upper layer, which is water-soluble, after being freed from the excess acid. When sulfonation is complete, as determined by the above test, the mass is diluted with water until an upper layer separates. The upper layer is drawn off and neutralized with any suitable base, such as caustic soda, caustic potash, or ammonia. We prefer to use ammonia.

The material or substance above described can be employed as an acid mass to treat a petroleum emulsion, but this is not desirable, due to its corrosive effect. There is no objection to an excess of alkali, if desired. Such material can also be converted into an ester by esterification in the usual manner to produce an aromatic or aliphatic ester such as the ethyl ester. Some of the esters so produced may be oil-soluble, such as the hexyl ester. The treating agent, when it is ready for use, may be acidic in nature, and the complex substituted aromatic sulfonic group may be united with an acid hydrogen ion, as is the case when the acid itself is employed. When said acidic material is neutralized, the hydrogen ion is replaced by a suitable metallic ion equivalent, such as a true metallic ion or an ammonium radical. In event that the material is esterified, the hydrogen ion is replaced by an organic radical such as an ethyl radical. We will refer to the hydrogen ion or its metallic substitute or its organic substitute as the hydrogen ion equivalent.

The form, state or condition of the treating agent at the time it is mixed with or applied to the petroleum emulsion to be treated, may be varied to meet existing conditions. It can be used in substantially anhydrous state, or in solutions of any convenient strength. A concentrated solution can be emulsified into oil by agency of any suitable oil-soluble emulsifier, such as calcium oleate. The treating agent can be formed entirely from a material of the kind previously described, or it can be formed from such a material in combination with other well known treating agents for petroleum emulsions of the water-in-oil type, such as water softeners, modified fatty bodies or their soaps, petroleum sulfonic acids or their salts, or other substances having similar properties.

In practising our process a treating agent or demulsifying agent of the kind above described may be brought in contact with the emulsion to be treated in any of the numerous ways now employed in the treatment of petroleum emulsions of the water-in-oil type with chemical demulsifying agents, such, for example, as by introducing the treating agent into the well in which the emulsion is produced; introducing the treating agent into a conduit through which the emulsion is flowing; introducing the treating agent into a tank in which the emulsion is stored, or introducing the treating agent into a container that holds a sludge obtained from the bottom of an old storage tank. In some instances, it may be advisable to introduce the treating agent into a producing well in such a way that it will become mixed with water and oil that are emerging from the surrounding strata, before said water and oil enter the barrel of the well pump or the tubing up through which said water and oil flow to the surface of the ground. After treatment the emulsion is allowed to stand in a quiescent state, usually in a settling tank, at a temperature varying from atmospheric temperature to about 200° F., so as to permit the water or brine to separate from the oil, it being preferable to keep the temperature low enough so as to prevent the valuable constituents of the oil from volatilizing. If desired, the treated emulsion may be acted upon by one or the other of various kinds of apparatus now used in the operation of breaking petroleum emulsions, such as homogenizers, hay tanks, gun barrels, filters, centrifuges or electrical dehydrators.

The amount of treating agent on the anhydrous basis that is required to break the emulsion may vary from approximately 1 part of treating agent to 500 parts of emulsion, up to a ratio of 1 part of treating agent to 20,000 parts of emulsion, depending upon the type or kind of emulsion being treated. In treating exceptionally refractory emulsions of the kind commonly referred to as "tank bottoms" or "residual pit oils," the minimum ratio above referred to is often necessary, but in treating fresh emulsions, i. e., emulsions that will yield readily to the action of chemical demulsifying agents, the maximum ratio above mentioned will frequently produce highly satisfactory results. For the average petroleum emulsion of the water-in-oil type a ratio of 1 part of treating agent to 5,000 parts of emulsion will usually be found to produce commercially satisfactory results.

Having thus described our invention, what we claim as new and desire to secure by Letters Patent of the United States is:

1. A process for breaking a petroleum emulsion of the water-in-oil type, which consists in subjecting the emulsion to the action of a demulsifying agent containing a sulfonic acid body derived from the condensation of an aromatic body and an aldehyde.

2. A process for breaking a petroleum emulsion of the water-in-oil type, which consists in subjecting the emulsion to the action of a water-soluble demulsifying agent containing a sulfonic acid body derived from the condensation of an aromatic body and an aldehyde.

3. A process for breaking a petroleum emulsion of the water-in-oil type, which consists in subjecting the emulsion to the action of a water-soluble demulsifying agent containing a water-soluble salt of a sulfonic acid body derived from the condensation of an aromatic body and an aldehyde.

4. A process for breaking a petroleum emulsion of the water-in-oil type, which consists in subjecting the emulsion to the action of a water-soluble demulsifying agent containing an ammonium salt of a sulfonic acid body derived from the condensation of an aromatic body and an aldehyde.

5. A process for breaking a petroleum emulsion of the water-in-oil type, which consists in subjecting the emulsion to the action of a demulsifying agent containing a sulfonic body derived from the condensation of a bicyclic aromatic body and an aldehyde.

6. A process for breaking a petroleum emulsion of the water-in-oil type, which consists in subjecting the emulsion to the action of a water-soluble demulsifying agent containing a sulfonic body derived from the condensation of a bicyclic aromatic body and an aldehyde.

7. A process for breaking a petroleum emulsion of the water-in-oil type, which consists in subjecting the emulsion to the action of a water-soluble demulsifying agent containing a water-soluble salt of a sulfonic body derived from the condensation of a bicyclic aromatic body and an aldehyde.

8. A process for breaking a petroleum emulsion of the water-in-oil type, which consists in subjecting the emulsion to the action of a water-soluble demulsifying agent containing an ammonium salt of a sulfonic body derived from the condensation of a bicyclic aromatic body and an aldehyde.

9. A process for breaking a petroleum emulsion of the water-in-oil type, which consists in subjecting the emulsion to the action of a demulsifying agent containing a sulfonic body derived from the condensation of a bicyclic aromatic body and an aliphatic aldehyde.

10. A process for breaking a petroleum emulsion of the water-in-oil type, which consists in subjecting the emulsion to the action of a water-soluble demulsifying agent containing a sulfonic body derived from the condensation of a bicyclic aromatic body and an aliphatic aldehyde.

11. A process for breaking a petroleum emulsion of the water-in-oil type, which consists in subjecting the emulsion to the action of a water-soluble demulsifying agent containing a water-soluble salt of a sulfonic body derived from the condensation of a bicyclic aromatic body and an aliphatic aldehyde.

12. A process for breaking a petroleum emulsion of the water-in-oil type, which consists in subjecting the emulsion to the action of a water-soluble demulsifying agent containing an ammonium salt of a sulfonic body derived from the condensation of a bicyclic aromatic body and an aliphatic aldehyde.

13. A process for breaking a petroleum emulsion of the water-in-oil type, which consists in subjecting the emulsion to the action of a demulsifying agent containing a sulfonic body derived from the condensation of a bicyclic aromatic body and formaldehyde.

14. A process for breaking a petroleum emulsion of the water-in-oil type, which consists in subjecting the emulsion to the action of a water-soluble demulsifying agent containing a sulfonic body derived from the condensation of a bicyclic aromatic body and formaldehyde.

15. A process for breaking a petroleum emulsion of the water-in-oil type, which consists in subjecting the emulsion to the action of a water-soluble demulsifying agent containing a water-soluble salt of a sulfonic body derived from the condensation of a bicyclic aromatic body and formaldehyde.

16. A process for breaking a petroleum emulsion of the water-in-oil type, which consists in subjecting the emulsion to the action of a water-soluble demulsifying agent containing an ammonium salt of a sulfonic body derived from the condensation of a bicyclic aromatic and formaldehyde.

17. A process for breaking a petroleum emulsion of the water-in-oil type, which consists in subjecting the emulsion to the action of a demulsifying agent containing a sulfonic body derived from the condensation of naphthalene and formaldehyde.

18. A process for breaking a petroleum emulsion of the water-in-oil type, which consists in subjecting the emulsion to the action of a water-soluble demulsifying agent containing a sulfonic body derived from the condensation of naphthalene and formaldehyde.

19. A process for breaking a petroleum emulsion of the water-in-oil type, which consists in subjecting the emulsion to the action of a water-soluble demulsifying agent containing a water-soluble salt of a sulfonic body derived from the condensation of naphthalene and formaldehyde.

20. A process for breaking a petroleum emulsion of the water-in-oil type, which consists in subjecting the emulsion to the action of a water-soluble demulsifying agent containing an ammonium salt of a sulfonic body derived from the condensation of naphthalene and formaldehyde.

MELVIN DE GROOTE.
BERNHARD KEISER.